(12) United States Patent
Kirmani et al.

(10) Patent No.: US 11,769,173 B2
(45) Date of Patent: Sep. 26, 2023

(54) GENERATING KEYWORDS BY ASSOCIATIVE CONTEXT WITH INPUT WORDS

(71) Applicant: eBay Inc., San Jose, CA (US)

(72) Inventors: Shad Kirmani, San Jose, CA (US); Manohara Shankar, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/520,387

(22) Filed: Nov. 5, 2021

(65) Prior Publication Data

US 2022/0058690 A1 Feb. 24, 2022

Related U.S. Application Data

(63) Continuation of application No. 16/895,991, filed on Jun. 8, 2020, now Pat. No. 11,216,844, which is a
(Continued)

(51) Int. Cl.
G06Q 30/02 (2023.01)
G06Q 30/0251 (2023.01)
(Continued)

(52) U.S. Cl.
CPC ......... *G06Q 30/0256* (2013.01); *G06F 16/00* (2019.01); *G06Q 30/0601* (2013.01)

(58) Field of Classification Search
CPC .............. G06Q 30/02; G06Q 30/0256; G06Q 30/0601; G06Q 30/0254; G06Q 10/067;
(Continued)

(56) References Cited

U.S. PATENT DOCUMENTS 6,363,379 B1 * 3/2002 Jacobson .............. G06F 16/355
707/999.005
6,862,586 B1 * 3/2005 Kreulen ................. G06F 16/94
707/999.102
(Continued)

FOREIGN PATENT DOCUMENTS

CN 104462060 B 8/2017
CN 108647322 A * 10/2018 ............... G06K 9/62
(Continued)

OTHER PUBLICATIONS

Salton, G., automatic Information Retrieval (English), Computer (vol. 13, Issue: 9, (pp. 41-56), Sep. 1, 1980 (Year: 1980).*
(Continued)

*Primary Examiner* — Marilyn G Macasiano
(74) *Attorney, Agent, or Firm* — SCHWEGMAN LUNDBERG & WOESSNER, P.A.

(57) ABSTRACT

Systems and methods are provided for accessing a plurality of inventory item listings accessible over a network, wherein each of the plurality of inventory item listings includes one or more text strings, and creating inventory word vectors for at least some of the text strings of the plurality of inventory item listings. The systems and methods further provide for receiving a user input including an input word, wherein the user input is input by a user to access a primary media content, creating an input word vector for the input word, calculating cosine similarities between the input word vector and the inventory word vectors, and analyzing the calculated cosine similarities to determine one or more keywords from the one or more text strings, wherein the one or more keywords are from the text strings having inventory word vectors with the highest cosine similarities to the input word vector.

20 Claims, 7 Drawing Sheets

Related U.S. Application Data continuation of application No. 15/472,982, filed on Mar. 29, 2017, now Pat. No. 10,699,302.

(51) Int. Cl.
  *G06Q 30/0601* (2023.01)
  *G06F 16/00* (2019.01)

(58) Field of Classification Search
  CPC . G06Q 30/0246; G06Q 30/0207; G06F 16/00
  See application file for complete search history.

(56) References Cited

U.S. PATENT DOCUMENTS

| | | | |
|---|---|---|---|
| 9,342,491 | B2 | 5/2016 | Bao et al. |
| 10,699,302 | B2 | 6/2020 | Kirmani et al. |
| 2006/0212350 | A1* | 9/2006 | Ellis ............... G06Q 30/0254 705/14.66 |
| 2008/0248815 | A1 | 10/2008 | Busch |
| 2011/0035379 | A1* | 2/2011 | Chen ............... G06F 16/2462 707/769 |
| 2014/0040723 | A1 | 2/2014 | Bao et al. |
| 2015/0235278 | A1* | 8/2015 | Skinner ............ G06Q 30/0275 705/14.71 |
| 2018/0285928 | A1 | 10/2018 | Kirmani et al. |
| 2020/0302479 | A1 | 9/2020 | Kirmani et al. |

FOREIGN PATENT DOCUMENTS

| | | | |
|---|---|---|---|
| EP | 2128774 A1 * | 12/2009 | ............ G06F 17/30 |
| EP | 2374070 B1 * | 6/2017 | ............ G06F 17/30 |
| WO | 2018/183306 A1 | 10/2018 | |

OTHER PUBLICATIONS

Alfirna Rizqi Lahitani; Adhistya Erna Permanasari; Noor Akhmad Setiawan, Cosine similarity to determine similarity measure: Study case in online essay assessment (English), 2016 4th International Conference on Cyber ans IT Service Management (pp. 1-6) , Apr. 1, 2016 (Year: 2016).*
Crocetti, Giancarlo, Textual Spatial Cosine Similairty (English), arXiv Article, May 14, 2015 (Year: 2015).*
Non Final Office Action Received for U.S. Appl. No. 16/895,991, dated May 13, 2021, 9 pages.
Notice of Allowance received for U.S. Appl. No. 16/895,991, dated Aug. 24, 2021, 9 pages.
U.S. Appl. No. 16/895,991, filed Jun. 8, 2020, Allowed.
U.S. Appl. No. 15/472,982, filed Mar. 29, 2017, Patented.
Google Code Archive—Long-term storage for Google Code Project Hosting., Retrieved from Internet URL: https://code.google.com/archive/p/word2vec/, Accessed on Jul. 27, 2020, 6 pages.
First Action Interview Office Action Summary Received for U.S. Appl. No. 15/472,982, dated Sep. 5, 2019, 10 Pages.
First Action Interview Pre-Interview Communication received for U.S. Appl. No. 15/472,982, dated Jun. 27, 2019, 9 pages.
Notice of Allowance received for U.S. Appl. No. 15/472,982, dated Feb. 24, 2020, 10 pages.
Wikipedia,"Cosine Similarity", Retrieved from Internet URL: https://en.wikipedia.org/wiki/Cosine_similarity, Accessed on Jul. 27, 2020, 6 pages.
Milkolov et al., "Efficient Estimation of Word Representations in Vector Space", Computation and Language, Retrieved from the Internet URL: https://arxiv.org/abs/1301.3781, Jan. 16, 2013, 12 pages.
International Search Report received for PCT Patent Application No. PCT/US2018/024536, dated Jun. 11, 2018, 2 pages.
International Written Opinion received for PCT Patent Application No. PCT/US2018/024536, dated Jun. 11, 2018, 5 pages.
International Preliminary Report on Patentability Received for PCT Application No. PCT/US2018/024536, dated Oct. 10, 2019, 7 pages.
Zhao et al., "Method for Calculating Text Similarity of Cross-Weighted Products Applied to Power Grid Model Search", (English), 2020 IEEE 4th Conference on Energy Internet and Energy System Integration (E12), Oct. 30, 2020, pp. 3863-3867.

* cited by examiner

500

Enter word or sentence (EXIT to break): frozen — 502

Word: frozen   Position in vocabulary: 2848

| Word — 504 | Cosine distance — 506 |
|---:|---:|
| elsa | 0.701934 |
| olaf | 0.689106 |
| arendelle | 0.599526 |
| kristoff | 0.570501 |
| mcstuffins | 0.540986 |
| disney | 0.532606 |
| tinkerbell | 0.520571 |
| anna | 0.515637 |
| frozen: | 0.508464 |
| ice | 0.496120 |
| minnie | 0.492547 |
| rapunzel | 0.490102 |
| dory | 0.488885 |
| magiclip | 0.475532 |
| bowtique | 0.452566 |

*FIG. 5*

GENERATING KEYWORDS BY ASSOCIATIVE CONTEXT WITH INPUT WORDS

CROSS REFERENCES

This application is a continuation of U.S. patent application Ser. No. 16/895,991 by Kirmani et al., entitled "Generating Keywords by Associative Context with Input Words," filed Jun. 8, 2020; which is a continuation of U.S. patent application Ser. No. 15/472,982 by Kirmani et al., entitled "Generating Keywords by Associative Context with Input Words," filed Mar. 29, 2017, now U.S. Pat. No. 10,699,302, issued on Jun. 30, 2020; each of which is incorporated herein by reference in its entirety.

TECHNICAL FIELD

The present disclosure relates generally to special-purpose machines that perform natural language processing, and more particularly to systems and methods for generating keywords.

BACKGROUND

Many websites, search engines, and other content providers allow users to input text in a native language. In some instances, such websites or providers permit input regarding search terms or phrases. For example, online marketplaces, content providers, libraries, and the like may permit a user to search for a sale item, listing, informational content, entertainment content, or other online material. The provided search results may be related directly to the input word or words that the user enters into the system for the search. In addition, various websites can also allow advertisers and other online content providers to utilize the user input in order to provide a contemporaneous advertisement or other related material. An advertisement triggered by a search term can be provided as a result of a keyword that may be a function of the input search word or words.

Keywords that are related to an advertisement or other secondary materials triggered by input words or terms are often found using analytics on historical data. In some instances, advertisers submit lists of keywords that they would like to have used to set triggers for their advertisements. In some cases, keywords can be within the titles of item listings promoted by the advertisement. While many techniques for finding keywords related to input words or terms have worked well in the past, improved ways of finding such keywords are desirable.

BRIEF DESCRIPTION OF THE DRAWINGS

Various embodiments of the present disclosure regarding keyword generation systems and methods are illustrated by way of example and not limitation in the figures of the accompanying drawings, in which like reference numbers indicate similar elements.

FIG. 5 shows an example output of calculated cosine similarities for words, according to some example embodiments.

DETAILED DESCRIPTION

Figure 1:
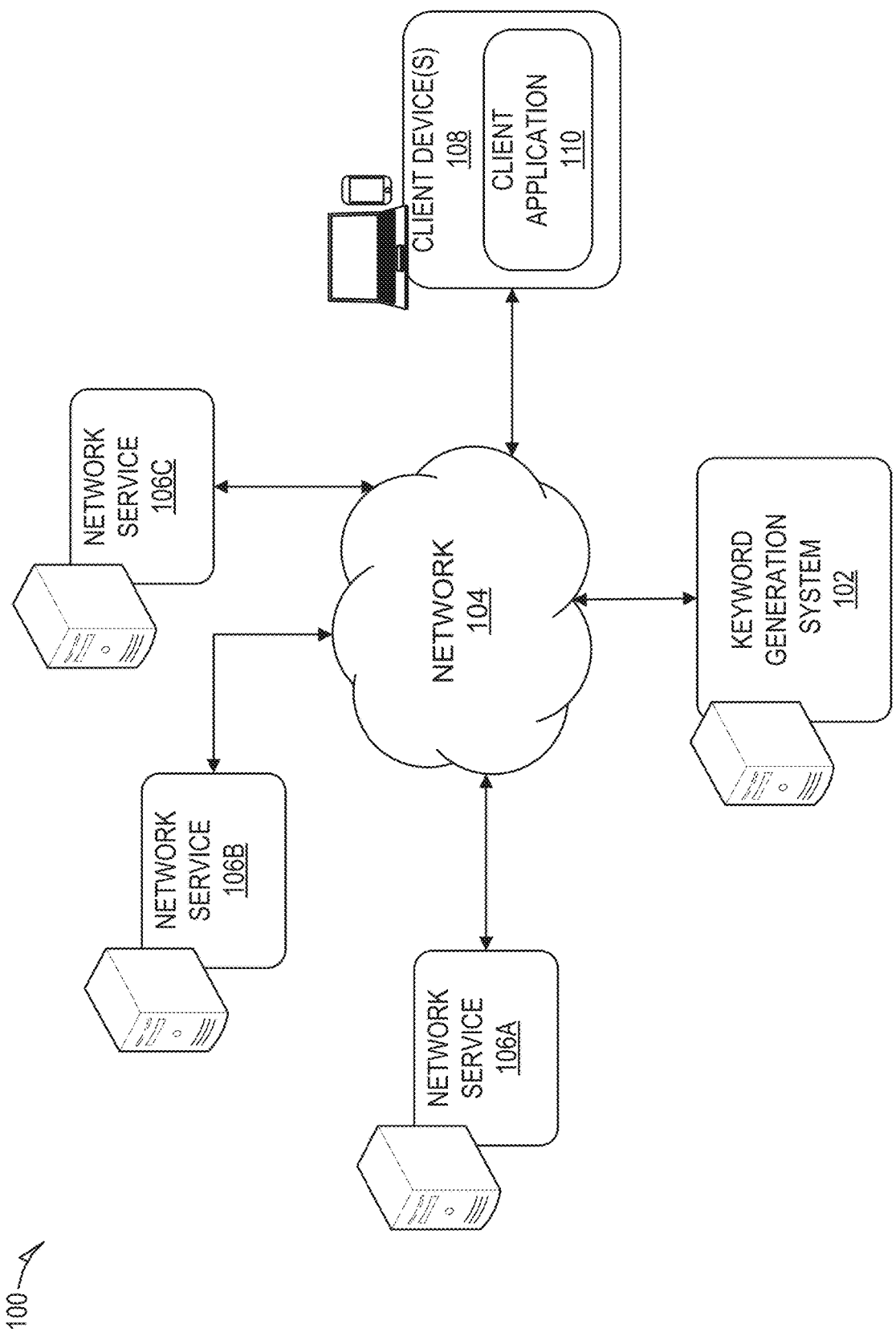
FIG. 1 is a block diagram illustrating a networked system, according to some example embodiments.

Aspects of the present disclosure include a system and methods for generating keywords. In example embodiments, a keyword generation system receives a text string (e.g., any combination of letters, symbols, numbers, spaces, and punctuation) that may be a user input. The user input may be for a different purpose than for the keyword generation system. For example, the user input may be for a search of an online website, database, or catalog, and the keyword generation system may generate one or more keywords that may be used to generate a targeted advertisement that is based on that user input. The targeted advertisement generated as a result of the one or more keywords may be presented to the user, such as on the same webpage. In one example, the targeted advertisement may be presented simultaneously with search results for the user input.

In general, the keyword generation system and methods generate keywords that appear in an associative context with other input words, such as a separate user input. In one example, the keyword generation system computes vectors relating to an associative correlation between the input words and a listing of some or all potential keywords. The listing of potential keywords may be, for example, some or all of keywords found in the titles of all listings for an online marketplace or inventory. Once the keyword generation system computes the vectors, the keyword generation system calculates cosine similarities with respect to the input words and some or all possible output keywords. One or more keywords having the highest cosine similarity are determined as a result.

The keyword generation system and methods may further include creating revised inventory word vectors for some of the same text strings for which inventory word vectors were originally created, calculating cosine similarities between the input word vector and the revised inventory word vectors, and generating one or more updated keywords from the text strings. The one or more updated keywords may be from the text strings having revised inventory word vectors with the highest cosine similarities to the input word vector.

In some embodiments, the user input may be given by a user to access a primary media content. The system and methods may also include associating generated keywords with a secondary media content and presenting the secondary media content to the user. The primary media content may be a set of search results, and the secondary media content may be a targeted advertisement. The primary media content and the secondary media content may be presented to the user simultaneously, such as on the same webpage. The inventory items (also termed inventory item listings herein) may be listings from an online marketplace, and the text strings from each of the plurality of inventory items may be from titles of the inventory items.

Generating and determining keywords may also include weighing further factors in addition to the inventory word vectors with the highest cosine similarities to the input word vector, such that the word vector association is not the only keyword-generating factor or component. Accessing inventory items may include accessing all items available over a predetermined time period, such as several days, weeks, or months. Creating inventory word vectors may include reducing the text strings into words only, which may involve removing all special text characters and putting all letters of the words into lower case.

FIG. 1 is a block diagram illustrating a networked system 100, according to some example embodiments. The networked system 100 includes a keyword generation system 102 in communication over a network 104 with network services 106A-C and one or more client devices 108. As discussed below, the keyword generation system 102 and network services 106A-C may be, or include, a machine such as a server or any other type of computing machine.

The keyword generation system 102, the network services 106A-C, and the client devices 108 may communicate over the network 104 via one or more Application Programming Interfaces (APIs). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wi-Fi® network, a WiMax network, another type of network, or a combination of two or more such networks.

The keyword generation system 102 may receive a text string and generate a keyword based on the text string. In one example, the text string may be a separate user input. The keyword generation system 102 may receive the text string from one of the network services 106A-C or from an external system or service in communication with the keyword generation system 102 over the network 104. In some arrangements, the keyword generation system 102 may be located on the same device or subsystem as one or more of the network services 106A-C. In one example, the network service 106A provides a web search service that includes a web search engine to search for information related to search queries input by users via client devices 108 (e.g., using a browser or other client application 110). In this example, the network service 106A may pass received search queries to the keyword generation system 102 prior to searching for information. In another example, the network service 106B provides a content publication service that receives submissions of content that includes text. In this example, the network service 106B may provide such text to the keyword generation system 102 prior to performing processing of such text. In another example, the network service 106C may be an online marketplace having a database or listing of inventory items. Other network services may also be possible in the alternative or in addition.

Upon generating a keyword based on a text string such as a user input, the keyword generation system 102 communicates the keyword to at least one of the network services 106A-C or to an external service in communication with the keyword generation system 102 over the network 104.

The client device 108 may also be referred to herein as a user device or a computing device. The client device 108 may comprise, but is not limited to, a mobile phone, desktop computer, laptop, portable digital assistant (PDA), smart phone, tablet, ultra-book, netbook, laptop, multi-processor system, microprocessor-based or programmable consumer electronic, game console, set-top box, computer in a vehicle, or any other communication device that a user may utilize to access the networked system 100. In some embodiments, the client device 108 may comprise a display module (not shown) to display information (e.g., in the form of user interfaces). In further embodiments, the client device 108 may comprise one or more of touch screens, accelerometers, gyroscopes, cameras, microphones, global positioning system (GPS) devices, and so forth. The client device 108 may be a device of a user that is used to perform search requests for various items and to view search results from the search requests.

One or more users may interact with the client device 108 (e.g., a person, a machine, or other means of interacting with the client device 108). In example embodiments, the user may not be part of the system 100, but may interact with the system 100 via the client device 108 or other means. For instance, the user may provide input (e.g., touch screen input or alphanumeric input) to the client device 108 and the input may be communicated to other entities in the system 100 (e.g., network service 106A-C, keyword generation system 102, etc.) via the network 104. In this instance, the other entities in the system 100, in response to receiving the input from the user, may communicate information to the client device 108 via the network 104 to be presented to the user. In this way, the user may interact with the various entities in the system 100 using the client device 108.

The client device 108 may access the various data and applications provided by other entities in the system 100 via a web client (e.g., a browser, such as the Internet Explorer® browser developed by Microsoft® Corporation of Redmond, Wash. State) or one or more client applications 110. As described above, the client device 108 may include one or more client applications 110 (also referred to as "apps") such as, but not limited to, a web browser, messaging application, electronic mail (email) application, an e-commerce site application, a mapping or location application, media content viewing application, and the like.

In some embodiments, the one or more client applications 110 may be included in a given one of the client device 108, and configured to locally provide the user interface and at least some of the functionalities of the client application 110. The client application 110 may be configured to communicate with other entities in the system 100, on an as-needed basis, for data and/or processing capabilities not locally available (e.g., for processing search queries, to access location information, to authenticate a user, to verify a method of payment, access media content stored on a server, sync media content between the client device 108 and a server computer, etc.). Conversely, one or more applications 110 may not be included in the client device 108, and then the client device 108 may use its web browser to access the one or more applications hosted on other entities in the system 100. Other entities may provide server-side functionality via the network 104 (e.g., the Internet or wide area network (WAN)) to the one or more client devices 108.

Figure 2:
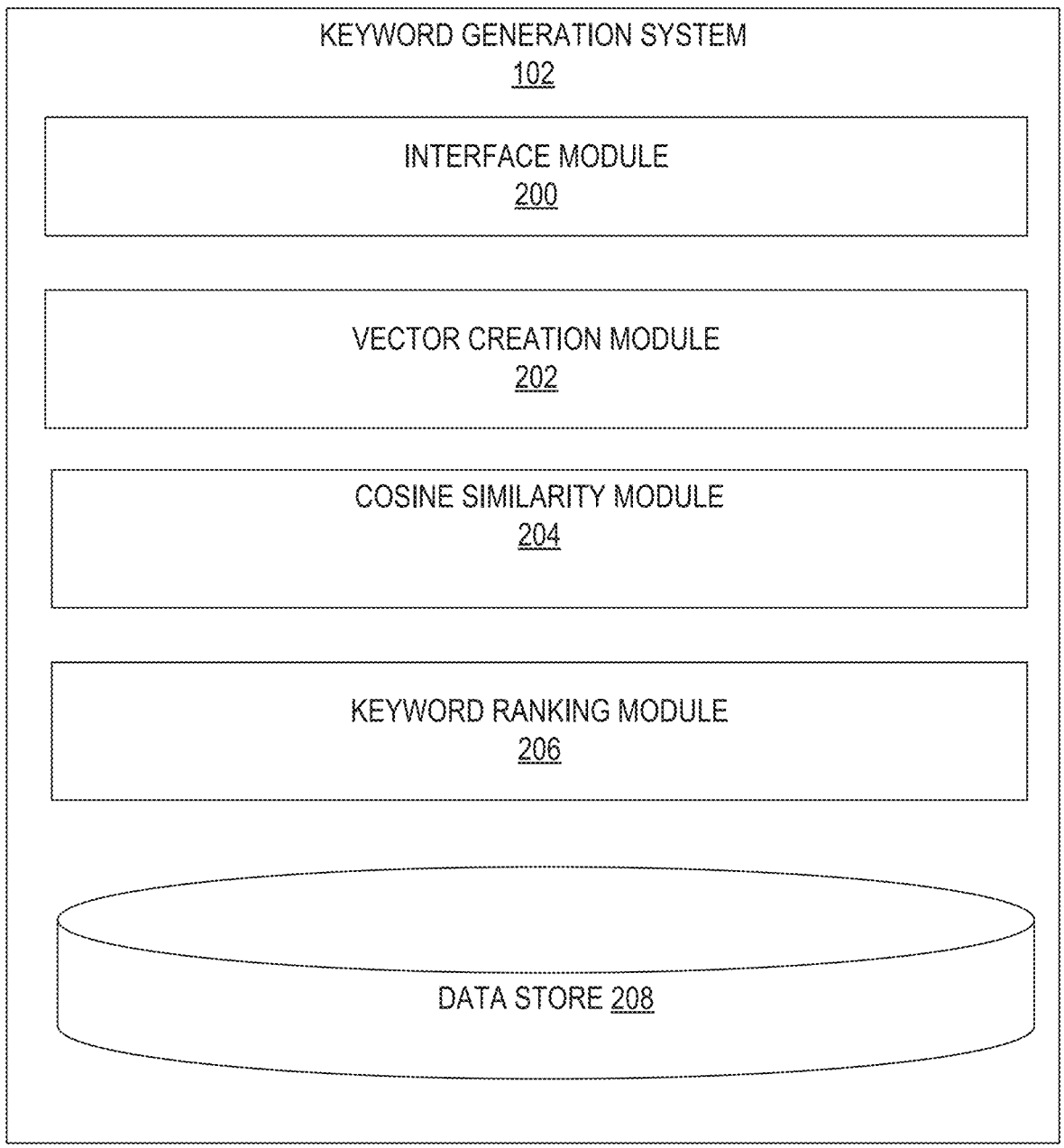
FIG. 2 is a system diagram illustrating example functional components of a keyword generation system, according to some example embodiments.

FIG. 2 is a system diagram illustrating example functional components of the keyword generation system 102, according to some example embodiments. It is noted that various functional components (e.g., modules, engines, and databases) that are not germane to conveying an understanding of the example embodiments may have been omitted from FIG. 2. A skilled artisan, however, will readily recognize that various additional functional components may be supported by the keyword generation system 102 to facilitate additional functionality that is not specifically described herein.

As shown in FIG. 2, the keyword generation system 102 includes an interface module 200, a vector creation module 202, a cosine similarity module 204, a keyword ranking module 206, and a data store 208. These functional components of the keyword generation system 102 are configured to communicate with each other (e.g., via a bus, shared memory, a switch, or APIs). Any one or more of the functional components illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 2 may be implemented together or separately within a single machine, database, or device or may be distributed across multiple machines, databases, or devices.

The interface module 200 includes one or more APIs that facilitate communication (e.g., an exchange of data) between the keyword generation system 102 and the network services 106A-C as well as external systems and services. The interface module 200 may receive requests (e.g., requests to generate a keyword based on a user input) from the network services 106A-C, and communicate appropriate responses (e.g., generated keywords) to the network services 106A-C. The interface module 200 may access inventory items from a separate source, such as an online marketplace having listed inventory items, for example. The interface module 200 may also receive a user input, such as from the online marketplace or another source. The interface module 200 may also return resulting keyword(s) and/or secondary media content to the online marketplace or another provider.

The vector creation module 202 may also include one or more APIs that facilitate communication between various modules and components within the keyword generation system 102. The vector creation module 202 may be used to create word vectors (also known as word embeddings) from both the inventory items and separate user inputs, such as search queries submitted by a user.

In various embodiments, the vector creation module 202 may create inventory word vectors for existing and known inventory items in advance. These inventory word vectors are stored for later use and calculations by other system components, such as the cosine similarity module 204. In one example, a recurrent neural network trains on words from inventory items, and once trained may be used to generate keywords that appear in the same context as user inputs. In this manner, the keyword generation system 102 may have inventory word vectors stored and ready for use when user inputs are later received.

The vector creation module 202 may also create input word vectors from the received user inputs. Various aspects regarding word vector creation are provided in greater detail below.

The cosine similarity module 204 may also include one or more APIs that facilitate communication between various modules and components within the keyword generation system 102. The cosine similarity module 204 may calculate cosine similarities between a given input word vector and some or all of the various inventory word vectors. The cosine similarity module 204 may output raw numbers or data for all of the various calculated cosine similarities. The output may be provided to a different module or component, such as a keyword ranking module 206.

The keyword ranking module 206 may accept data (e.g., cosine similarities) calculated by the cosine similarity module 204, and may use this data to rank the various cosine similarities or ratings between the input word and the various inventory.

The data store 208 includes a computer-readable storage device to store data related to the functioning of the keyword generation system 102. For example, the data store 208 may serve as storage (e.g., a cache) for inventory items at various times, created inventory word vectors, user inputs, input word vectors, calculated cosine similarities, generated keywords resulting from various user inputs, or any combination thereof.

Figure 3:
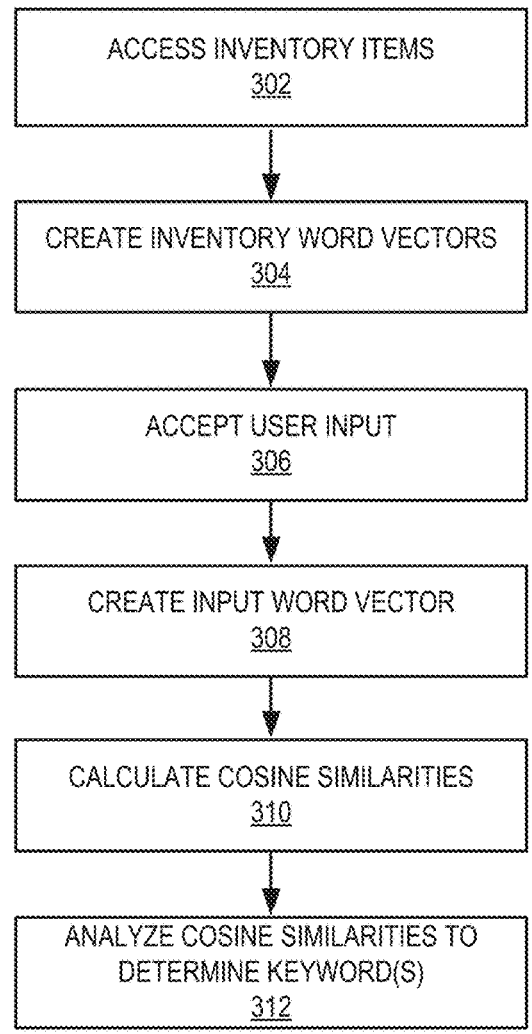
FIG. 3 is a flow chart illustrating aspects of a method, according to some example embodiments.

FIG. 3 is a flow chart illustrating aspects of a method 300, according to some example embodiments, for providing a keyword generation service. For illustrative purposes, method 300 is described with respect to the networked system 100 of FIG. 1. It is to be understood that method 300 may be practiced with other system configurations in other embodiments. A machine-readable storage device may comprise instructions stored thereon that are executable by at least one processor to cause a machine to perform the operations of method 300.

At operation 302, the keyword generation system 102 (e.g., via a server computer or other computing device) accesses inventory items over a network. As explained above, the inventory items may include one or more text strings, such as in a title of an inventory item. Such inventory items may be, for example, some or all listings on an online marketplace. In one example, the keyword generation system 102 may access inventory items within a particular time window (e.g., within the last day, week, ten days, month, for specific dates, etc.).

At operation 304, the keyword generation system 102 creates inventory word vectors for at least some of the text strings of the inventory items. In one example, the keyword generation system 102 may transform the letters of all words in the one or more text strings of the inventory items into lower-case letters. In another example, the keyword generation system 102 may reduce the text strings into words only. For example, the keyword generation system 102 may replace all special characters (e.g., "!", "%", etc.) with spaces. The result may be one or more cleaned-up text strings. The keyword generation system 102 then uses the one or more cleaned-up text stings to compute word vectors (e.g., using open source tools or other tools for computing word vectors) for each word. The result is a mapping of a word to a vector. The keyword generation system 102 stores the computed inventory word vectors in one or more data stores 208. In one example, the inventory word vectors are used to determine keywords in a similar context as a user input word, as explained below.

In another example, the inventory word vectors are used to determine additional keywords in a similar context as keywords for an advertising campaign (e.g., to trigger an advertisement based on a user input). For example, a manufacturer of shavers may want to run an advertisement to promote shavers. Besides keywords in items corresponding to target items and a list of keywords provided by the manufacturer, the keyword set for triggering the advertisement may be expanded to include additional keywords in a similar context as the keywords provided. For example, keywords such as "trimmers," "blades," other shaver manufacturer names, and so forth, may be generated using example embodiments described herein.

For instance, an entity may be running a campaign for the movie "Frozen." Using synonyms to get keywords similar in context to "Frozen" would result in words such as "snow," "ice," and the like. Instead, the results should be keywords such as "Olaf," "Elsa," and so forth. Keywords for other children's movies, such as "Pinocchio" and *Cinderella*," may also be useful. In one example, a vector may be created for each word. In another example, the length of the vectors may be specified. For example:

Vector size 3
Elsa: [121]
Olaf: [101911]

Figure 4:
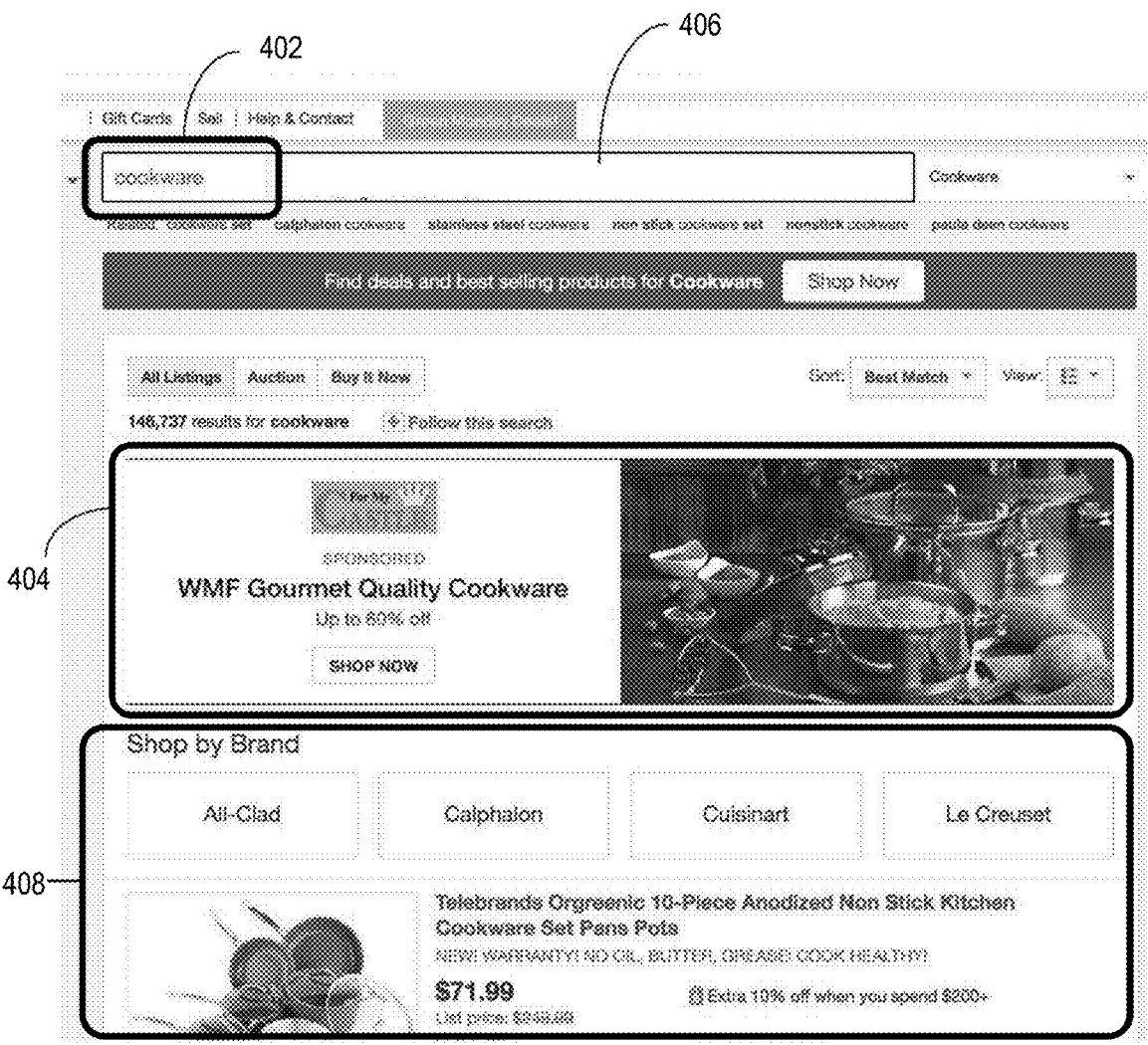
FIG. 4 illustrates an example user interface showing an example user input and resulting primary and secondary media content displayed simultaneously, according to some example embodiments.

At operation 306, the keyword generation system 102 receives or accepts a user input including an input word. An input word may be a term or string, such as a text string describe earlier (e.g., any combination of letters, symbols, numbers, spaces, and punctuation). For example, a user may input a word or words into a search field on a website as shown in FIG. 4. FIG. 4 shows an example user interface 400 on a computing device (e.g., client device 108) with a search field 406 for a user input 402. In this example, the user has input the word "cookware" to search for pots and pans and the like. An advertisement or other media content 404 related to the user input may also be displayed to the user along with the search results 408 for the user input 402. The keyword generation system 102 may receive the user input 402 directly from the client device 108 or via a network service 106A-C or other system. The user input 402 may be input by the user to access a primary media content (e.g., search results related to "cookware").

Referring again to FIG. 3, the keyword generation system 102 creates an input word vector for the input word from the user, as shown in operation 308. The input word vector is created as described above for computed word vectors for inventory items.

In operation 310, the keyword generation system 102 calculates cosine similarities between the input word vector and the inventory word vectors. The output of the calculation may include raw numbers or data for all of the various calculated cosine similarities. For example, the output may be a list of words that appear in the same context.

Two words will be similar if their cosign similarity is higher than with other words. Using the example above related to the movie "Frozen," the cosine similarity for Elsa and Olaf may be calculated by:

Dot product Vector(Elsa),Vector(Olaf)/product of magnitude of vectors

Cosine similarity=$1*10+2*19+1*11/(1^2+2^2+1^2)^{0.5}*(10^2+19^2+11^2)^{0.5}$

In operation 312, the keyword generation system 102 analyzes the calculated cosine similarities to determine one or more keywords from the one or more text strings. The one or more keywords may be from the text strings having inventory word vectors with the highest cosine similarities to the input word vector. For example, the keyword generation system 102 may sort the list of words that appear in the same context and choose a subset of the words (e.g., the top 10 words) that have the highest cosine similarity. In another example, the keyword generation system 102 may choose a subset of the words based on a predetermined threshold (e.g., only choose words above a predetermined amount of similarity). The subset of words that have the highest cosine similarity are the keywords determined to be the most similar in context to the input word.

In one example, the one or more keywords have an associative context with the user input word based on the cosine similarities, rather than a context based on historical data analysis or direct manual listing by a secondary media content provider. In another example, the keyword generation system 102 may use a combination of total keywords which are determined from the one or more keywords and also keywords based on history data analysis and direct manual listing, or other methods.

In one example, when the keyword generation system 102 is analyzing the calculated cosine similarities to determine one or more keywords, the keyword generation system 102 may weigh further factors in addition to the inventory word vectors with the highest cosine similarities to the input word vector.

FIG. 5 shows an example output 500 of calculated cosine similarities for words 504 in the same context of an input word 502 "frozen." Each word 504 is listed with an associated cosign distance 506.

An example pseudo code, using the "Frozen" example, may comprise:

Input: Mapping[word]→ vectors
Output: List of words that appear in same context
Compute cosine similarity ("Frozen" with all words in Mapping)
Sort all cosine similarities for "Frozen" with all word in Mapping
Pick the top 10 words that have highest cosine similarity
These top 10 words are the words most similar in context to "Frozen"

In one example, the one or more keywords are used to produce a set of search results (e.g., a primary media content) in response to the input word by the user. For example, the one or more keywords may be used to pull information associated with the one or more keywords to be displayed to the user as search results.

In another example, the one or more keywords are used to trigger a secondary media content such as an advertisement (e.g., a targeted advertisement). For example, the keyword generation system may associate the one or more keywords with a secondary media content. These one or more keywords act as triggers for providing the secondary media content to be displayed to a user. Returning to FIG. 4 as an example, a user may input a word 402 "cookware." The word "cookware" may trigger a secondary media content, such as an advertisement 404 for an online store selling cookware. The results 408 for the search for "cookware" may be displayed simultaneously with an advertisement 404 for an online store selling cookware.

Inventory word vectors may periodically be updated or revised. For example, the time period of the inventory items may be changed, new inventory items may be added, and so forth. For example, the keyword generation system 102 creates revised inventory word vectors for at least some of the same text strings for which inventory word vectors were originally created. The keyword generation system 102 may create revised inventory word vectors periodically, based on predetermined criteria, or other methods. For example, the keyword generation system 102 may create revised inventory word vectors when an entity wishes to revise a particular advertisement campaign. In another example, the keyword generation system 102 may create revised inventory word vectors based on a date or time that the originally created (or previously created) inventory word vectors were created (e.g., every few hours, each day, one a week, etc.). For instance, the originally created or previously created inventory word vectors may be associated with a creation timestamp. When the keyword generation system 102 receives an input word, it may check the creation timestamp of the originally created inventory word vectors and create revised inventory word vectors if the creation timestamp is before a predetermine date or time.

The keyword generation system 102 may then calculate cosine similarities between the input word vector and the revised inventory word vectors, as explained above. The keyword generation system 102 then analyzes the calculated cosine similarities to determine one or more updated keywords from the one or more text strings, as also explained above. The one or more updated keywords may be from the text strings having inventory word vectors with the highest cosine similarities to the input word vector.

Figure 6:
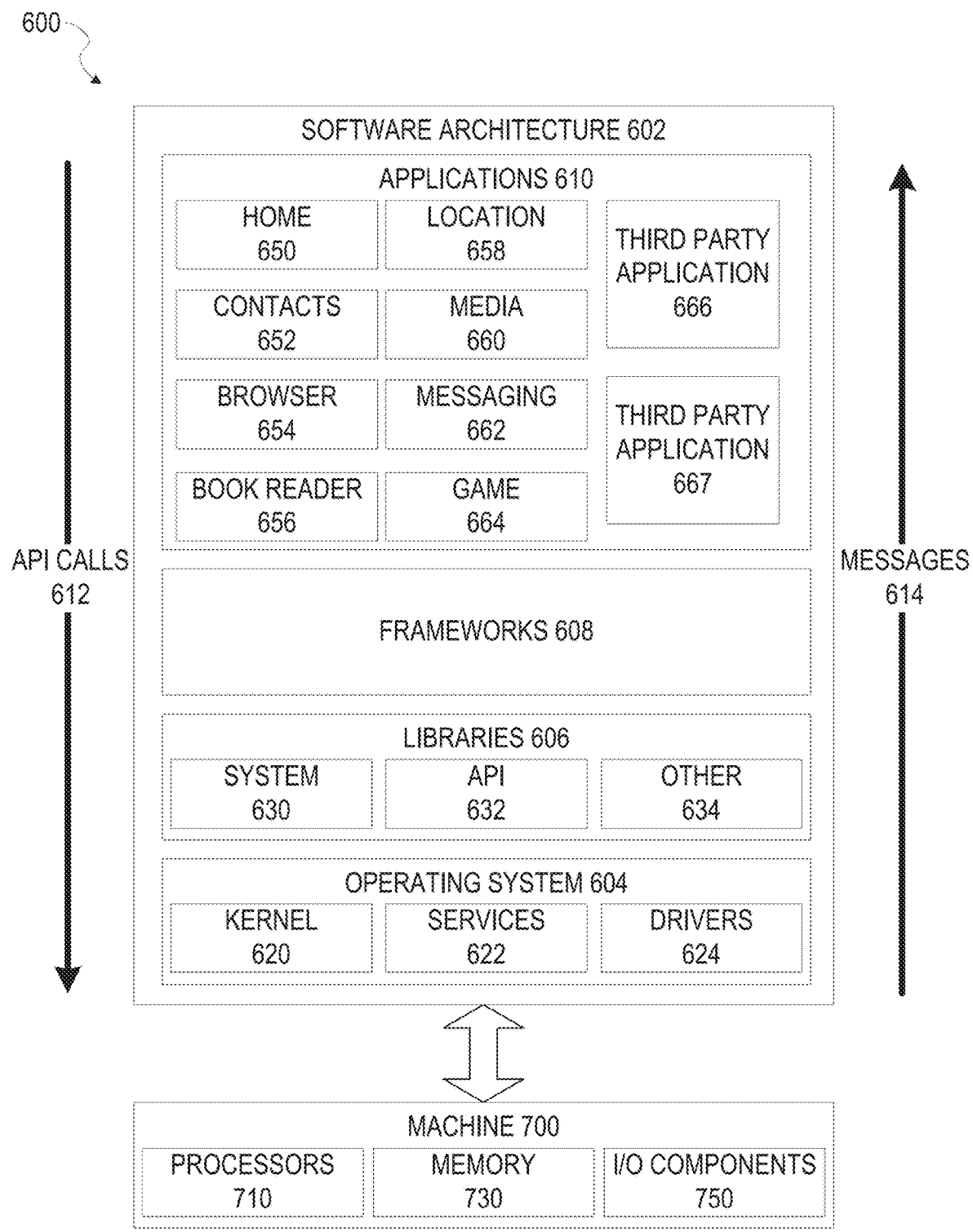
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 108, the keyword generation system 102, and network services 106A-C may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 666 can invoke the API calls 612 provided by the operating system 604 to facilitate functionality described herein.

As explained above, some embodiments may particularly include a browser application 654 or other application that allows a user to search for media content. In certain embodiments, this may be a stand-alone application that operates to manage communications with a server system such as the keyword generation system 102 or network services 106A-C. In other embodiments, this functionality may be integrated with another application such as a messaging application 662, location application 658, and so forth. Browser application 654 may request and display various media content items and may provide the capability for a user to input data (e.g., an input word) related to media content items via a touch interface, keyboard, or using a camera device of machine 700, communication with the keyword generation system 102 via I/O components 750, and receipt and storage of media content items in memory 730. Presentation of media content items and user inputs associated with media content items may be managed by browser application 654 using different frameworks 608, library 606 elements, or operating system 604 elements operating on a machine 700.

Figure 7:
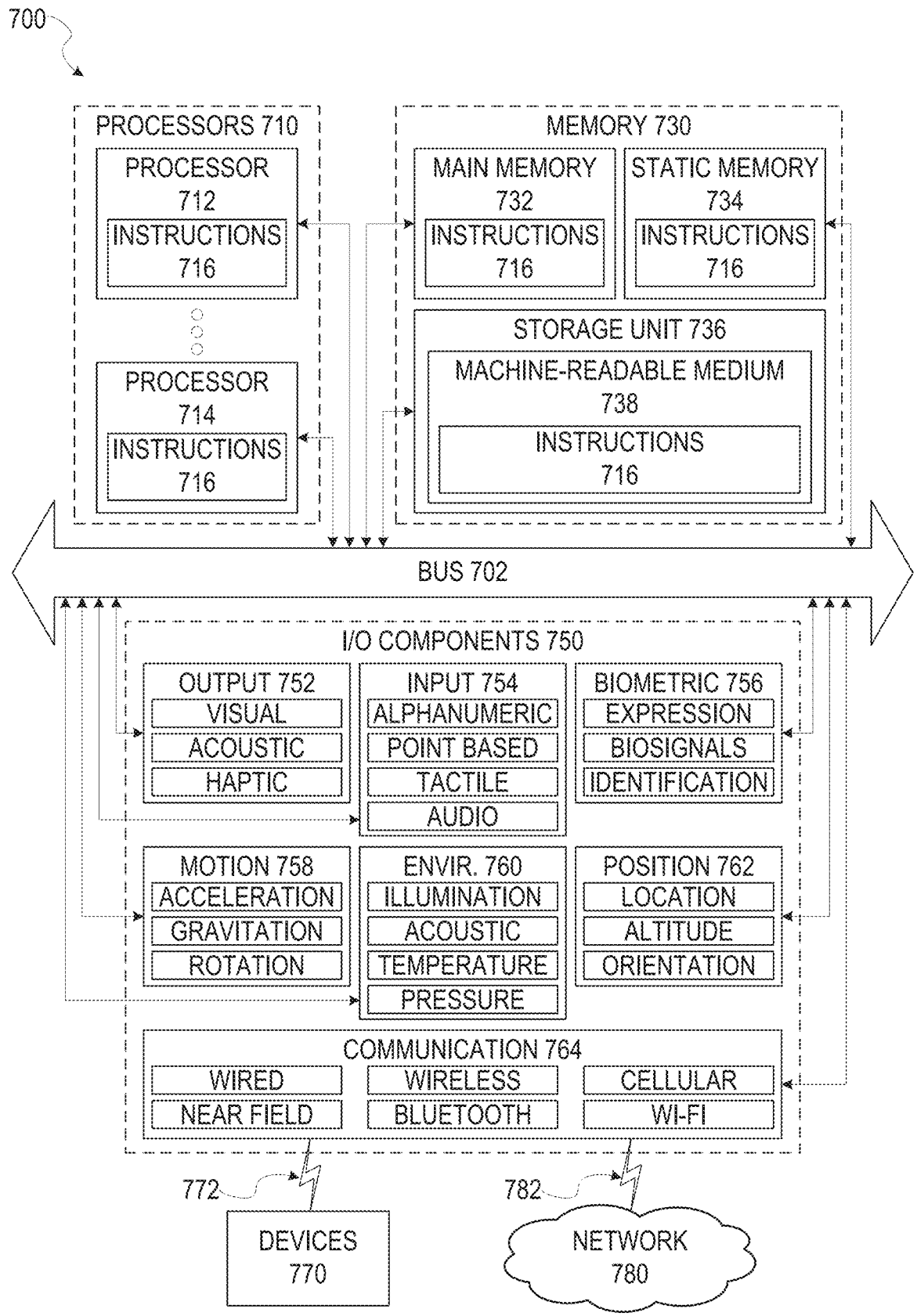
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of the keyword generation system 102, network services 106A-C, or related server or system, or a client device 108 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    receiving, from a client device, a search query corresponding to an item listed in an online marketplace;
    determining, by one or more processors, one or more keywords based at least in part on a plurality of cosine similarities calculated between a text string included in the search query and a plurality of text strings corresponding to a plurality of listings available via the online marketplace;
    identifying, by the one or more processors, a search result corresponding to one or more listings from the plurality of listings available via the online marketplace based at least in part on the one or more keywords; and
    outputting, to the client device, the search result corresponding to the one or more listings in response to the search query.

2. The method of claim 1, wherein determining the one or more keywords comprises:
    calculating a plurality of cosine similarities between the text string included in the search query and a plurality of text strings corresponding to the plurality of listings to determine the one or more keywords.

3. The method of claim 2, wherein determining the one or more keywords comprises:
    ranking the plurality of cosine similarities to identify a subset of the plurality of cosine similarities, wherein the one or more keywords correspond to the subset of the plurality of cosine similarities.

4. The method of claim 2, wherein determining the one or more keywords comprises:
    identifying a subset of the plurality of cosine similarities that satisfy a threshold, wherein the one or more keywords correspond to the subset of the plurality of cosine similarities.

5. The method of claim 1, further comprising:
    selecting a secondary media content for display based at least in part on the one or more keywords, wherein outputting the search result comprises outputting the search result comprising the secondary media content.

6. The method of claim 5, wherein the secondary media content comprises an advertisement.

7. The method of claim 1, further comprising:
    creating a first word vector from at least one listing of the plurality of listings;
    creating a second word vector from the text string included in the search query; and
    calculating one or more cosine similarities based at least in part on the first word vector and the second word vector.

8. The method of claim 1, further comprising:
    receiving an update to a listing of the plurality of listings; and
    creating an updated word vector associated with the listing based at least in part on receiving the update, wherein identifying the search result corresponding to the one or more listings from the plurality of listings is based at least in part on the updated word vector.

9. A system, comprising:
    at least one processor; and
    a memory device storing instructions that, when executed by the at least one processor, cause the system to perform operations comprising:
        receiving, from a client device, a search query corresponding to an item listed in an online marketplace;
        determining one or more keywords based at least in part on a plurality of cosine similarities calculated between a text string included in the search query and a plurality of text strings corresponding to a plurality of listings available via the online marketplace;
        identifying a search result corresponding to one or more listings from the plurality of listings available via the online marketplace based at least in part on the one or more keywords; and
        outputting, to the client device, the search result corresponding to the one or more listings in response to the search query.

10. The system of claim 9, wherein the instructions to determine the one or more keywords are further executable to perform operations comprising:
    calculating a plurality of cosine similarities between the text string included in the search query and a plurality of text strings corresponding to the plurality of listings to determine the one or more keywords.

11. The system of claim 10, wherein the instructions to determine the one or more keywords are further executable to perform operations comprising:
    ranking the plurality of cosine similarities to identify a subset of the plurality of cosine similarities, wherein the one or more keywords correspond to the subset of the plurality of cosine similarities.

12. The system of claim 10, wherein the instructions to determine the one or more keywords are further executable to perform operations comprising:
    identifying a subset of the plurality of cosine similarities that satisfy a threshold, wherein the one or more keywords correspond to the subset of the plurality of cosine similarities.

13. The system of claim 9, wherein the instructions are further executable to perform operations comprising:
    selecting a secondary media content for display based at least in part on the one or more keywords, wherein outputting the search result comprises outputting the search result comprising the secondary media content.

14. The system of claim 13, wherein the secondary media content comprises an advertisement.

15. The system of claim 9, wherein the instructions are further executable to perform operations comprising:
creating a first word vector from at least one listing of the plurality of listings;
creating a second word vector from the text string included in the search query; and
calculating one or more cosine similarities based at least in part on the first word vector and the second word vector.

16. The system of claim 9, wherein the instructions are further executable to perform operations comprising:
receiving an update to a listing of the plurality of listings; and
creating an updated word vector associated with the listing based at least in part on receiving the update, wherein identifying the search result corresponding to the one or more listings from the plurality of listings is based at least in part on the updated word vector.

17. A non-transitory computer-readable medium comprising instructions that, when executed by one or more processors, cause a machine to perform operations comprising:
receiving, from a client device, a search query corresponding to an item listed in an online marketplace;
determining one or more keywords based at least in part on a plurality of cosine similarities calculated between a text string included in the search query and a plurality of text strings corresponding to a plurality of listings available via the online marketplace;
identifying a search result corresponding to one or more listings from the plurality of listings available via the online marketplace based at least in part on the one or more keywords; and
outputting, to the client device, the search result corresponding to the one or more listings in response to the search query.

18. The non-transitory computer-readable medium of claim 17, wherein the instructions to determine the one or more keywords are further executable to cause the machine to perform operations comprising:
calculating a plurality of cosine similarities between the text string included in the search query and a plurality of text strings corresponding to the plurality of listings to determine the one or more keywords.

19. The non-transitory computer-readable medium of claim 18, wherein the instructions to determine the one or more keywords are further executable to cause the machine to perform operations comprising:
ranking the plurality of cosine similarities to identify a subset of the plurality of cosine similarities, wherein the one or more keywords correspond to the subset of the plurality of cosine similarities.

20. The non-transitory computer-readable medium of claim 18, wherein the instructions are further executable to cause the machine to perform operations comprising:
identifying a subset of the plurality of cosine similarities that satisfy a threshold, wherein the one or more keywords correspond to the subset of the plurality of cosine similarities.

* * * * *